3,567,718
NOVEL DIETHYLAMINE COMPOUNDS AND
MEANS FOR THEIR PRODUCTION
Edward F. Elslager, Ann Arbor, Mich., assignor to
Parke, Davis & Company, Detroit, Mich.
No Drawing. Filed Nov. 18, 1968, Ser. No. 776,800
Int. Cl. C07c 119/10; C07d 33/54
U.S. Cl. 260—240                                    3 Claims

ABSTRACT OF THE DISCLOSURE

N,N''-(p-phenylenedimethylidyne)bis[N' - [2-(diethylamino)-ethyl]-1,4-naphthalenediamine] and 5,5'-[p-phenylenebis(methylidyneimino)]bis[8 - [[2-(diethylamino)-ethyl]amino]-quinoline] are provided by reacting respectively N-[2-(diethylamino)ethyl] - 1,4-naphthalenediamine and 5-amino-8-[[2-(diethylamino)ethyl]amino]-quinoline with terephthalaldehyle. The products have antiparasitic properties and are useful schistosomacides.

SUMMARY AND DETAILED DESCRIPTION

The present invention relates to novel diethylamine compounds that are useful as pharmacological agents and means for their production. More particularly, the invention relates to diethylamine compounds having in free base form the formula

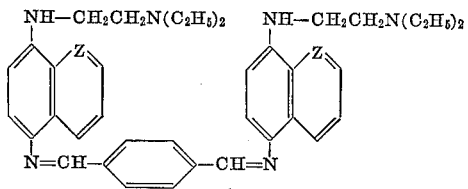

where Z is CH or N.

In accordance with the invention the compounds are produced by reacting terephthaldehyde with N-[2-(diethylamino)ethyl]-1,4-naphthalenediamine or 5-amino-8-[[2-(diethylamino)ethyl]amino]quinoline. The reaction is carried out preferably in a non-reactive water-immiscible solvent. Suitable solvents, for example, are hydrocarbons such as benzene, toluene and xylene; chlorinated hydrocarbons such as chloroform and trichloroethane; ethers such as diisopropyl ether and dibutyl ether; and mixtures of such solvents. A preferred solvent is xylene. Regarding quantities of reactants used, 2 equivalents of the mentioned diamine (or quinoline) for each equivalent or terephthaledehyde are preferred, although a slight excess of ether reactant may be used if desired. The reaction conditions are subject to variation. Temperatures in the range from about 30–200° C. for periods from about 1–24 hours may be used. Preferably the reaction is carried out in the range from about 130–145° C. for about 2–5 hours. The product is isolated from the reaction mixture conveniently as the free base. Suitable methods of isolation include evaporation of the solvent, concentration and crystallization or precipitation with a suitable solvent in which the product is relatively insoluble. Although the product may be isolated in salt form, such salts are susceptible to hydrolysis.

The compounds of the invention are useful as chemotherapeutic agents, especially as antiparasitic agents and particularly as schistosomacides. Their antiparasitic activity can be demonstrated and quantitatively measured in standard tests against the schistosome species *Schistosoma mansoni*.

In the test used to determine schistosomacidal activity, female Stout mice weighing 13–15 grams each are infected intraperitoneally with 75 *S. mansoni* (Puerto Rican strain) cercariae (from the snail host *Australorbis glabratus*) six weeks prior to treatment. The experimental groups usually consist of 5 to 10 mice, while the sham-dosed control groups number 10 to 15 mice per experiment. All of the mice are fed Rockland mouse food from the time of infection to autopsy. The test compounds are administered in the diet. Following treatment for a measured period, the animals are killed and autopsied and the activity of the test compound is evaluated primarily on the basis of the distribution and number of living and dead worms in the liver, portal veins, and mesenteric veins. This activity is then expressed in terms of the percentage of schistosomes found killed after the period of treatment at a given dosage level, which is expressed as a percentage of the diet. The activities of compounds of the invention, as determined by this test procedure, are shown in the table that follows. The compounds in the table are identified by reference to the examples that follow, where the preparation of each is described.

SCHISTOSOMACIDAL ACTIVITY

| Compound: | Percent schistosomes dead at percent mouse diet for number of days |
|---|---|
| Example 1 | 98/0.0625/14 |
| Example 2 | 100/0.125/14 |

Example 1

A solution of 16.5 g. of N-[2-(diethylamino)ethyl]-1,4-naphthalenediamine dihydrochloride in 200 ml. of water is made alkaline with ammonium hydroxide and extracted with xylene. The extracts are washed with water and dried. A solution of 3.35 g. of terephthalaldehyde in xylene is added and the solution is heated under reflux for 3 hours until water is no longer being collected in the water trap. The solid which forms upon allowing the reaction to cool is removed by filtration, washed with 2,2,4-trimethylpentane and dried in vacuo to afford the product, N,N''-(p-phenylenedimethylidyne)bis[N'-[2-(diethylamino)ethyl]-1,4-naphthalenediamine]; M.P. 175–177° C.

Example 2

A solution of 7 g. of 5-amino-8-[[2-(diethylamino)-ethyl]amino]quinoline trihydrochloride [Campbell et al., J. Am. Chem. Soc., 68, 1561 (1946)] in about 30 ml. of ice water is made basic with ammonium hydroxide and extracted with xylene. The extracts are washed with water and dried. A solution of 1.3 g. of terephthaldehyde in xylene is added and the mixture is heated under reflux for 3 hours under a water take-off trap. The xylene is concentrated in vacuo to a volume of 100 ml. and cooled. The solid which forms is collected and dried in vacuo to give the product, 5,5'-[p-phenylenebis(methylidyneimino)]bis-[8-[[2-(diethylamino)ethyl]amino]quinoline]; M.P. 196–198° C.

I claim:
1. A diethylamine compound of the formula

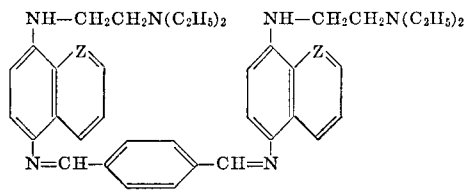

where Z is CH or N.
2. N,N''-(p-phenylenedimethylidyne)bis[N'-[2-(diethylamino)ethyl]-1,4-naphthalenediamine].
3. 5,5'-[p-phenylenediamine(methylidyneimino)]bis[8-[[2-(diethylamino)ethyl]quinoline].

References Cited
UNITED STATES PATENTS

| | | | |
|---|---|---|---|
| 2,388,903 | 11/1945 | Cantrell et al. | 260—240 |
| 2,940,970 | 6/1960 | Adams et al. | 260—240 |
| 3,198,767 | 8/1965 | Matsuda et al. | 260—65 |

OTHER REFERENCES

Chemical Abstracts, vol. 61, col. 4282 (1964) (abstracts of Elslager et al.).

JOHN D. RANDOLPH, Primary Examiner

U.S. Cl. X.R.

424—258, 327; 260—566